US009017551B2

(12) United States Patent
Kennedy et al.

(10) Patent No.: US 9,017,551 B2
(45) Date of Patent: Apr. 28, 2015

(54) TANK FACILITY WITH SIDE ACCESS

(75) Inventors: Robert J. Kennedy, Elizabethtown (CA); Jeff J. Kempson, Kingston (CA); Paul C. Brake, Brockville (CA)

(73) Assignee: Newterra Group Ltd. (CA)

( * ) Notice: Subject to any disclaimer, the term of this patent is extended or adjusted under 35 U.S.C. 154(b) by 993 days.

(21) Appl. No.: 13/156,978

(22) Filed: Jun. 9, 2011

(65) Prior Publication Data

US 2012/0292318 A1 Nov. 22, 2012

(30) Foreign Application Priority Data

May 19, 2011 (CA) ..................................... 2740535

(51) Int. Cl.

| | |
|---|---|
| ***B01D 29/00*** | (2006.01) |
| ***B01D 35/30*** | (2006.01) |
| ***B01D 61/18*** | (2006.01) |
| ***B01D 61/20*** | (2006.01) |
| ***C02F 3/12*** | (2006.01) |
| *B01D 35/00* | (2006.01) |
| *B01D 51/00* | (2006.01) |

(52) U.S. Cl.

CPC ................ *B01D 61/18* (2013.01); *B01D 61/20* (2013.01); *B01D 2313/02* (2013.01); *B01D 2313/06* (2013.01); *B01D 2313/50* (2013.01); *B01D 2313/56* (2013.01); *B01D 2315/06* (2013.01); *C02F 3/1273* (2013.01); *C02F 2303/14* (2013.01)

(58) Field of Classification Search

CPC .... B01D 61/18; B01D 61/20; B01D 2313/02; B01D 2313/06; B01D 2313/14; B01D 2313/56; B01D 2313/50; B01D 2315/06; B01D 2313/20; C02F 3/1273

USPC ............ 210/172.6, 244, 416.1, 257.1, 257.2, 210/615–617, 232, 236–238, 241, 249; 220/200, 562, 564, 565; 414/266, 267, 414/396

See application file for complete search history.

(56) References Cited

U.S. PATENT DOCUMENTS

| | | | | |
|---|---|---|---|---|
| 4,591,434 A * | 5/1986 | Prudhomme | ................. | 210/117 |
| 2006/0021929 A1 * | 2/2006 | Mannheim et al. | ........ | 210/321.6 |

* cited by examiner

*Primary Examiner* — Nam Nguyen
*Assistant Examiner* — Madeline Gonzalez
(74) *Attorney, Agent, or Firm* — Thompson Hine LLP

(57) ABSTRACT

A side access tank facility including an enclosure for containing water therein. The enclosure has an opening disposed in a side wall thereof. A cover covers the opening in a water sealing engagement with the enclosure. The side access tank facility further comprises an in-tank equipment holding structure for holding in-tank equipment at a predetermined position inside the enclosure. A moving mechanism is provided for moving the in-tank equipment holding structure between a position inside the enclosure and a position outside the enclosure.

8 Claims, 9 Drawing Sheets

128 118 100 116 114 112 106 120 122 108 104 124 110 126 105

102 100 103 108 134 104 106 146 110 140 128 126 130

TANK FACILITY WITH SIDE ACCESS

This application claims priority to Canadian Patent Application No. 2,740,535, on May 19, 2011, entitled TANK FACILITY WITH SIDE ACCESS, by inventors Robert Kennedy, Jeff Kempson, and Paul Brake, in the name of Calco Environmental Group Ltd., the entire contents of which are hereby incorporated by reference.

FIELD

The present invention relates to the field of tank facilities for containing water, and more particularly to a tank facility with side access.

BACKGROUND

In waste water treatment, tank facilities are used for performing the various processing steps such as, for example, mixing, aeration, and filtering. State of the art waste water treatment processes use Membrane Bio Reactor (MBR) systems—with, for example, flat plane membranes—for filtering the waste water. Some systems are preferably employed in small to medium size applications with the systems being provided as pre-fabricated units with a maximum height of approximately 10 feet suitable for shipping on flat bed trucks. The membranes of the MBR systems require removal in regular time intervals for cleaning, maintenance, and replacement.

Unfortunately, state of art systems provide only access to the membranes from the top of the tank. Access from the top of the tank requires: an access platform on the top of the tank; lifting equipment such as a crane; and multiple operators. Furthermore, access from the top of tank requires placing of the MBR in a taller building for providing sufficient space above the tank for the operator and for the lifting equipment. Alternatively, access has to be provided through the roof of the building posing a substantial safety risk for the operators, particularly, in adverse weather conditions.

In smaller to medium size applications it is desirable to provide a tank facility with side access.

It is also desirable to provide a tank facility with side access having a holding structure for holding in-tank equipment within the tank facility and for facilitating movement of the in-tank equipment.

It is also desirable to provide a tank facility with side access having a guiding mechanism for enabling guided movement of the in-tank equipment.

SUMMARY

Accordingly, one object of the present invention is to provide a tank facility with side access.

Another object of the present invention is to provide a tank facility with side access having a holding structure for holding in-tank equipment within the tank facility and for facilitating movement of the in-tank equipment.

Another object of the present invention is to provide a tank facility with side access having a guiding mechanism for enabling guided movement of in-tank equipment.

According to one aspect of the present invention, there is provided a side access tank facility. The side access tank facility comprises an enclosure for containing water therein. The enclosure has an opening disposed in a side wall thereof. A cover covers the opening in a water sealing engagement with the enclosure. The side access tank facility further comprises an in-tank equipment holding structure for holding in-tank equipment at a predetermined position inside the enclosure. A moving mechanism is provided for moving the in-tank equipment holding structure between a position inside the enclosure and a position outside the enclosure.

According to another aspect of the present invention, there is further provided a side access tank facility. The side access tank facility comprises an enclosure for containing water therein. The enclosure has an opening disposed in a side wall thereof. A cover covers the opening in a water sealing engagement with the enclosure. The side access tank facility further comprises an in-tank equipment holding structure for holding in-tank equipment at a predetermined position inside the enclosure. A moving mechanism is provided for moving the in-tank equipment holding structure between a position inside the enclosure and a position outside the enclosure. The moving mechanism comprises a guiding mechanism mounted to an inside of the enclosure and interacting with respective guiding elements mounted to the in-tank equipment holding structure. The guiding mechanism guides horizontal movement of the in-tank equipment holding structure between the position inside the enclosure and the position outside the enclosure. The guiding mechanism comprises, for example, a rail structure interacting with wheels mounted to the in-tank equipment holding structure. A ramp is pivotally movable mounted to the inside of the enclosure in proximity to the opening. The ramp is pivotally movable from a storage position inside the enclosure through the opening into an operating position with the ramp being oriented approximately horizontal. Alternately the ramp is removable for external storage.

According to another aspect of the present invention, there is further provided a side access tank facility. The side access tank facility comprises an enclosure for containing water therein. The enclosure has an opening disposed in a side wall thereof. A cover covers the opening in a water sealing engagement with the enclosure. The side access tank facility further comprises an in-tank equipment holding structure for holding in-tank equipment at a predetermined position inside the enclosure. A moving mechanism is provided for moving the in-tank equipment holding structure between a position inside the enclosure and a position outside the enclosure. The in-tank equipment comprises at least a membrane module for filtering the water. At least a fluid conduit is disposed inside the enclosure and removable connected to the in-tank equipment. The at least a fluid conduit is designed such that connection and disconnection of the same is enabled in proximity to the opening. The side access tank facility further comprises an air diffuser disposed in a bottom portion of the in-tank equipment holding structure.

One advantage of the present invention is that it provides a tank facility with side access.

A further advantage of the present invention is that it provides a tank facility with side access having a holding structure for holding in-tank equipment within the tank facility and for facilitating movement of the in-tank equipment.

A further advantage of the present invention is that it provides a tank facility with side access having a guiding mechanism for enabling guided movement of in-tank equipment.

BRIEF DESCRIPTION OF THE DRAWINGS

An embodiment of the present invention is described below with reference to the accompanying drawings, in which.

DETAILED DESCRIPTION

Figure 1A:
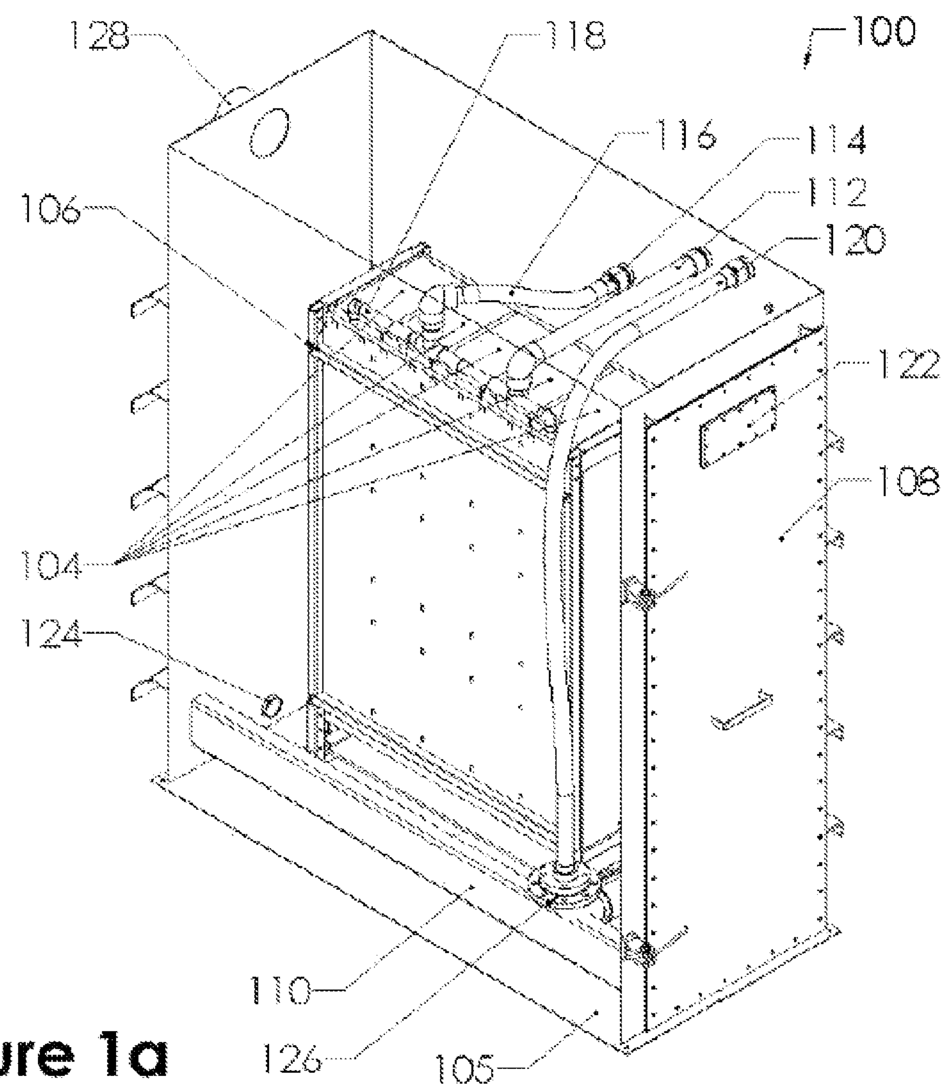
FIG. 1*a* is a simplified block diagram illustrating a transparent perspective view of a side access tank facility in a closed position according to an embodiment of the invention.
Figure 1B:
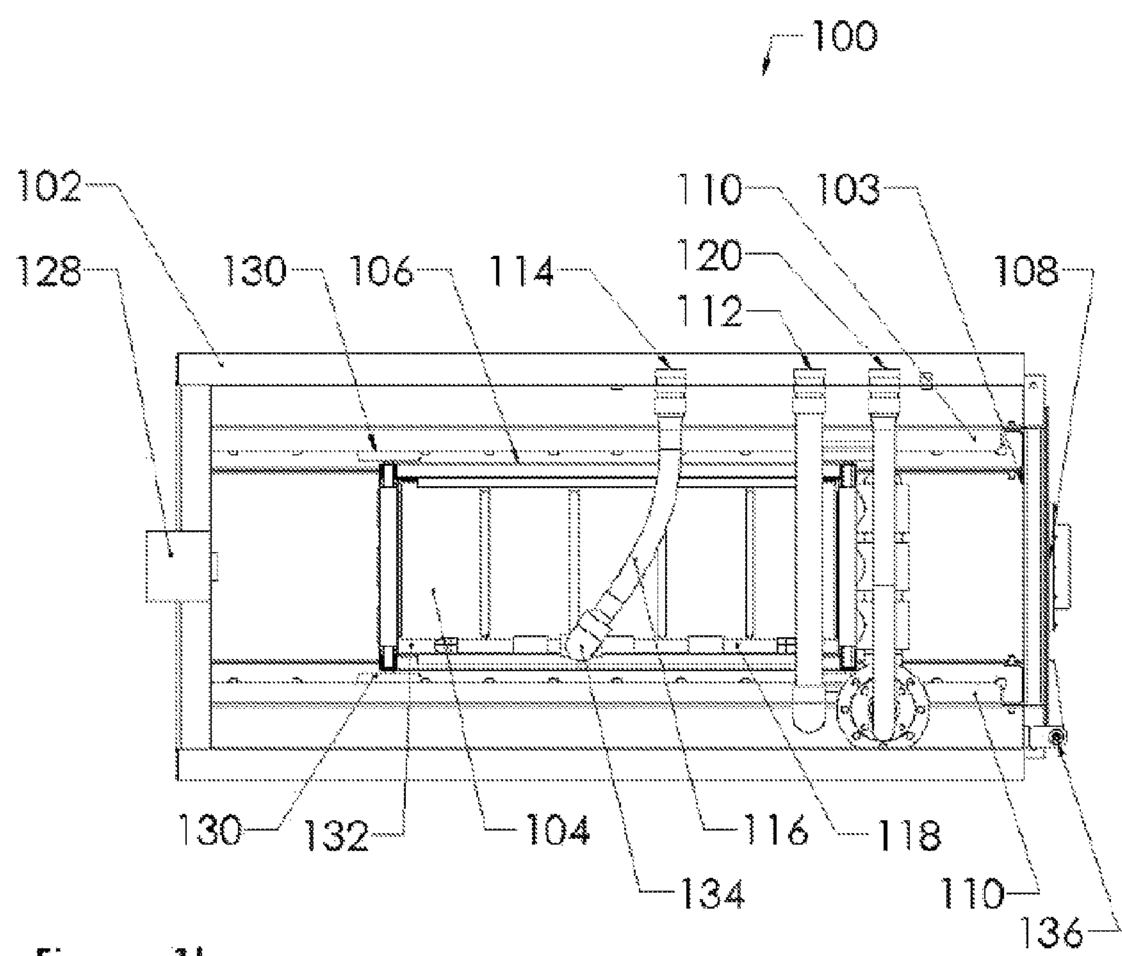
FIG. 1*b* is a simplified block diagram illustrating a transparent top view of the side access tank facility in the closed position according to an embodiment of the invention.
Figure 1C:
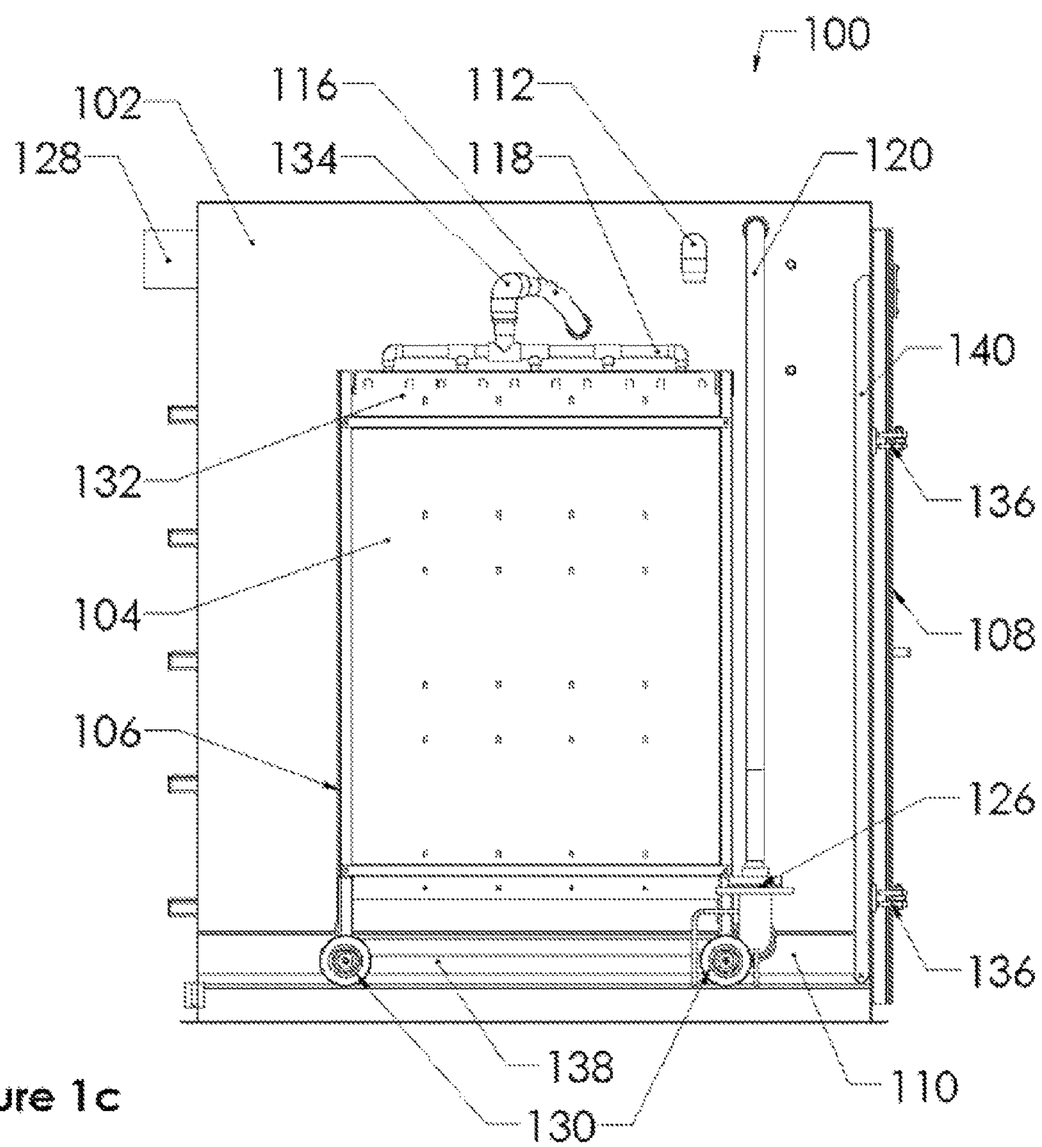
FIG. 1*c* is a simplified block diagram illustrating a transparent side view of the side access tank facility in the closed position according to an embodiment of the invention.
Figure 1D:
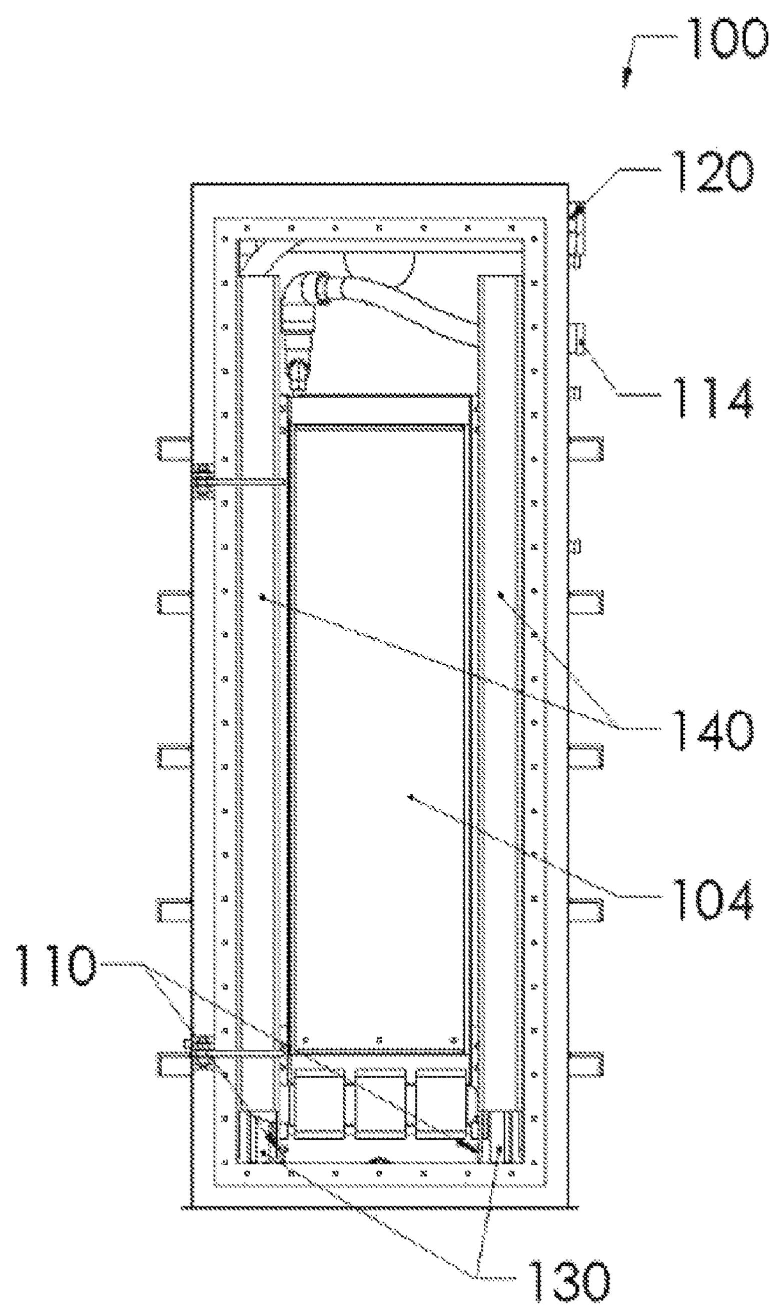
FIG. 1*d* is a simplified block diagram illustrating a transparent front view of the side access tank facility in the closed position according to an embodiment of the invention.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

While embodiments of the invention will be described for use with a MBR system, it will become evident to those skilled in the art that the embodiments of the invention are not limited thereto, but are applicable for use with tank facilities of other waste water treatment processing steps such as mixing and aeration as well as for other water treatment processes such as, for example, filtering processes for providing drinking water.

Referring to FIGS. 1*a* to 2*d*, a side access tank facility 100 according to an embodiment of the invention is provided. The side access tank facility 100 comprises enclosure 102 for containing water—such as, for example, waste water for filtration—therein with an opening 103 disposed in a side wall thereof. The opening may extend to bottom floor 105 of the enclosure 102 in order to facilitate movement of in-tank equipment there through, as will be described herein below. The enclosure is made of a suitable metal such as, for example, stainless steel. Alternatively, other suitable materials are employed such as composite materials or plastic materials or carbon steel and other metal alloys. The enclosure may be block-shaped, as illustrated, but other shapes such as, for example, cylindrical shape, are also employable.

Cover 108 covers the opening 103 in a water sealing engagement with the enclosure 102 when closed. The cover 108 is removable mounted to the enclosure using standard technology such as, for example, flanges disposed on the cover 108 and the enclosure 102 and screw bolts with standard nuts and washers. To provide water sealing engagement, gasket 142 surrounding the opening 103 is disposed between the enclosure 102 and the cover 108. With the screw bolts and respective wing nuts sufficiently tightened the cover 108 is in water sealing engagement with the enclosure 102. The gasket 142 is, for example, a full Neoprene gasket. The cover 108 may be pivotally movable mounted to the enclosure 102 via hinges 136 to facilitate handling by a single operator. The cover 108 is made of a suitable material, for example, the same material as the enclosure 102. Optionally, the cover 108 comprises window 122 disposed in a top portion thereof allowing the operator to check the fill level of the tank facility 100 and foaming inside the tank facility 100.

In-tank equipment holding structure 106 is disposed inside the enclosure 102 for holding in-tank equipment 104—such as, for example, membrane modules for filtering waste water, as illustrated in the FIGS. 1*a* to 2*d*—at a predetermined position inside the enclosure 102. The in-tank equipment holding structure 106 comprises, for example, a frame structure designed for holding the in-tank equipment 104 in a secure fashion using various types of supports and securing mechanisms known to one skilled in the art. The frame structure is made of, for example a metal material such as steel.

The side access tank facility 100 further comprises a moving mechanism for moving the in-tank equipment holding structure 106 between a position inside the enclosure 102 and a position outside the enclosure 102. The moving mechanism comprises, for example, wheels, rollers or casters mounted to the in-tank equipment holding structure 106 for rolling the same on the floor 105 and, for example, onto a ramp disposed outside the enclosure 102. The wheels are, for example, provided as preassembled off-the-shelf units for being mounted to the frame structure of the in-tank equipment holding structure 106 and made of suitable materials such as, for example, metal and plastic materials. Alternatively, the in-tank equipment holding structure 106 is, for example, pivotally movable mounted to the enclosure 102 enabling pivotal movement in a substantially horizontal plane.

The side access tank facility 100 may further comprise a guiding mechanism mounted to the inside of the enclosure 102 which interacts with respective guiding elements mounted to the in-tank equipment holding structure 106 for guiding horizontal movement of the in-tank equipment holding structure 106 between the position inside the enclosure 102 and the position outside the enclosure 102. The guiding mechanism comprises, for example, a rail structure 110 interacting with wheels 130 mounted to the in-tank equipment holding structure 106. The rail structure 110 is, for example, made of steel and mounted to the enclosure 102 using a screw mechanism or is welded thereto.

The rail structure 110 may comprise a ramp 140 pivotally movable mounted to the inside of the enclosure 102 in proximity to the opening via pivots 144. The ramp is pivotally movable from a storage position inside the enclosure through the opening 103 into an operating position with the ramp 140 being oriented approximately horizontal. Alternatively, the ramp is removed and stored outside the enclosure then installed in place by the operator in order to remove the in tank equipment holding structure 106. The ramp 140 comprises, for example, a left hand side and a right hand side rail extension made of a suitable material such as, for example, stainless steel and is pivotally movable mounted using, for example, bolts accommodated in respective apertures disposed in the rail 110 and the ramp 140. Alternatively, the ramp is placed on the floor 105—for example, below the in-tank equipment holding structure 106—for being pulled out and placed as an extension of the rail structure 110.

The rail structure 110 may comprise a retaining mechanism 146 for retaining the in-tank equipment holding structure 106 in a predetermined position inside the enclosure 102. The retaining mechanism comprises, for example, a U-shaped clamp designed for accommodating a wheel 130 therein when mounted to the rail structure 110, for example, by accommodating end portions of the flanges of the U-shaped clamp in respective apertures disposed in the rail structure 110.

Figure 1E:
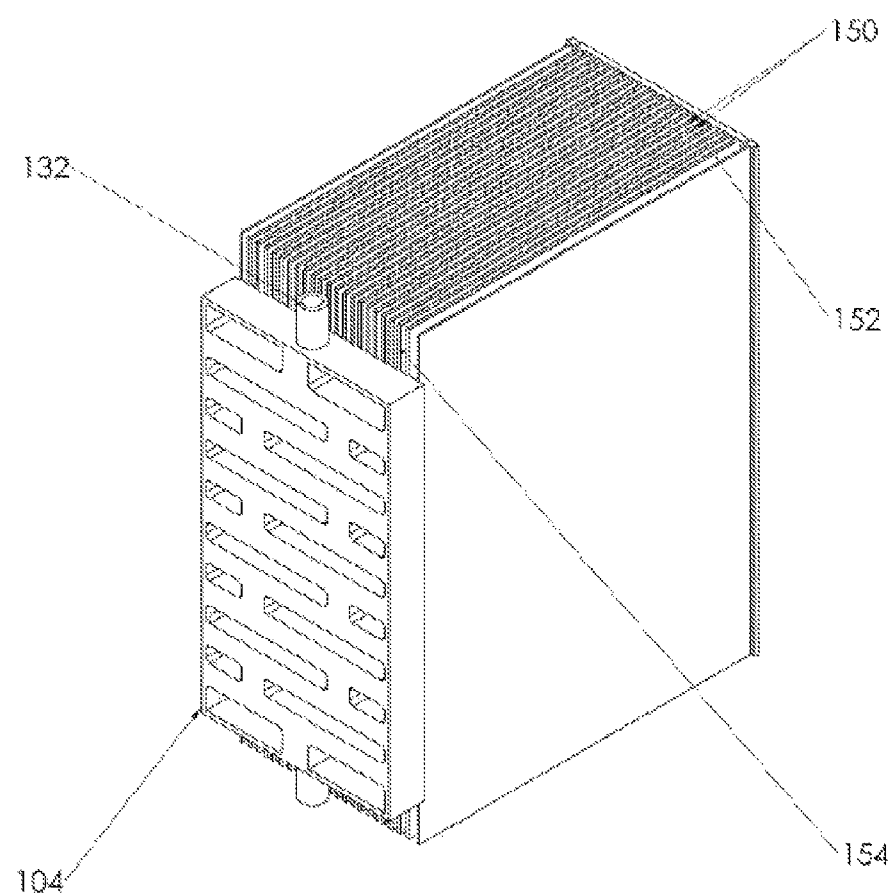
FIG. 1*e* is a simplified block diagram illustrating a perspective view of a membrane module for implementation with the side access tank facility according to an embodiment of the invention.
Figure 2A:
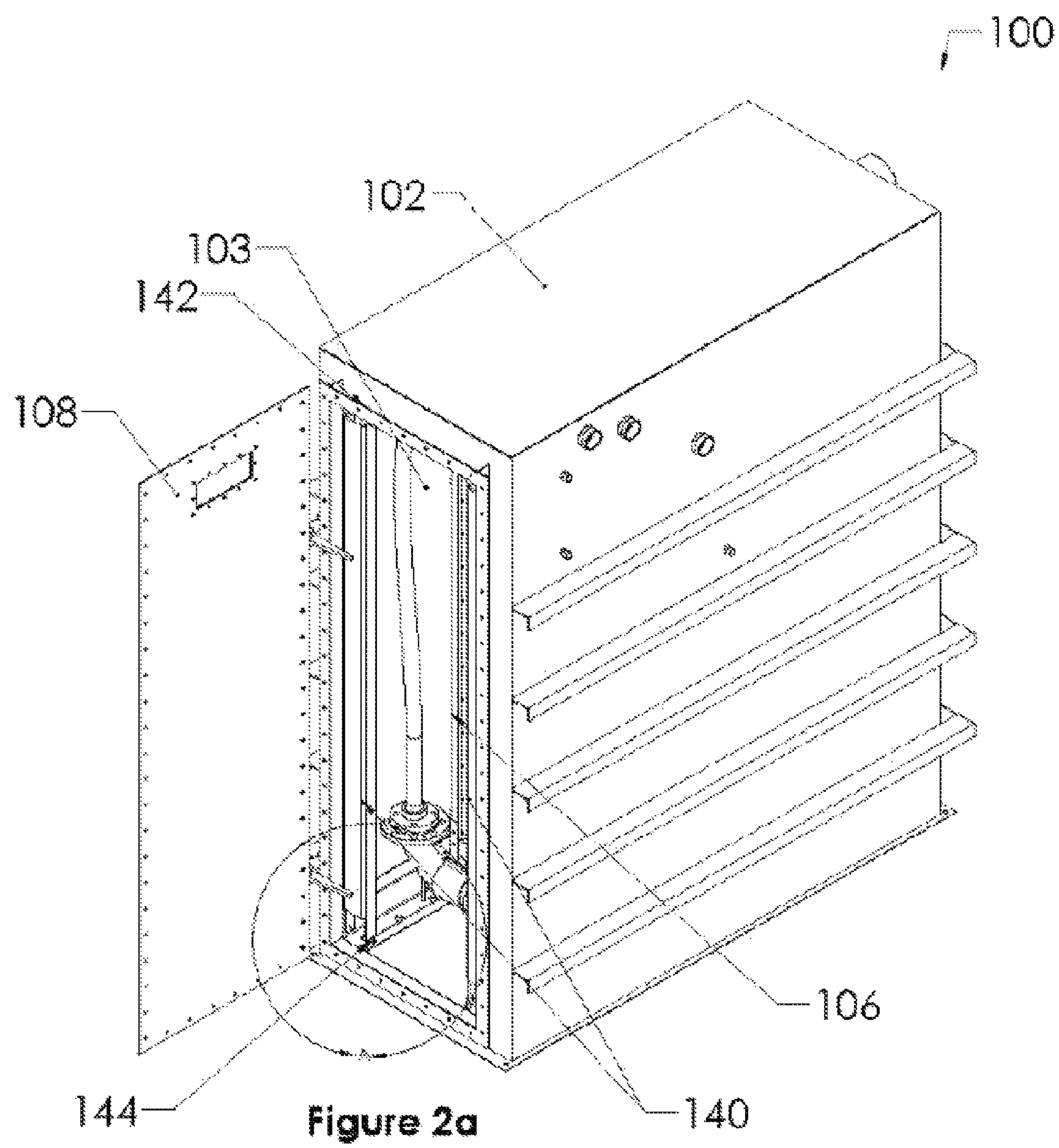
FIG. 2*a* is a simplified block diagram illustrating a perspective view of the side access tank facility with the door opened according to an embodiment of the invention.
Figure 2B:
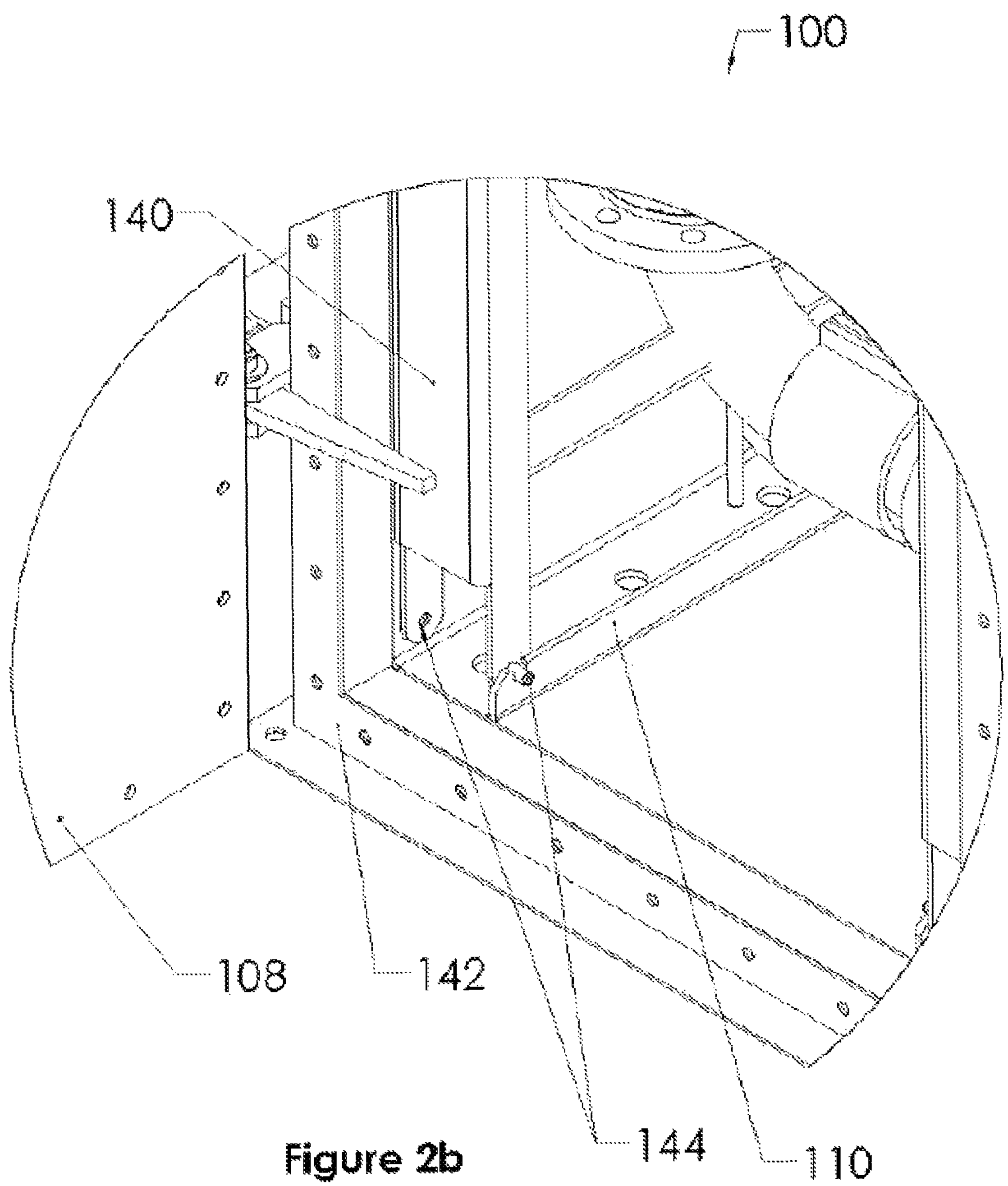
FIG. 2*b* is a simplified block diagram illustrating a perspective view of detail A shown in FIG. 2*a* of the side access tank facility according to an embodiment of the invention.
Figure 2C:
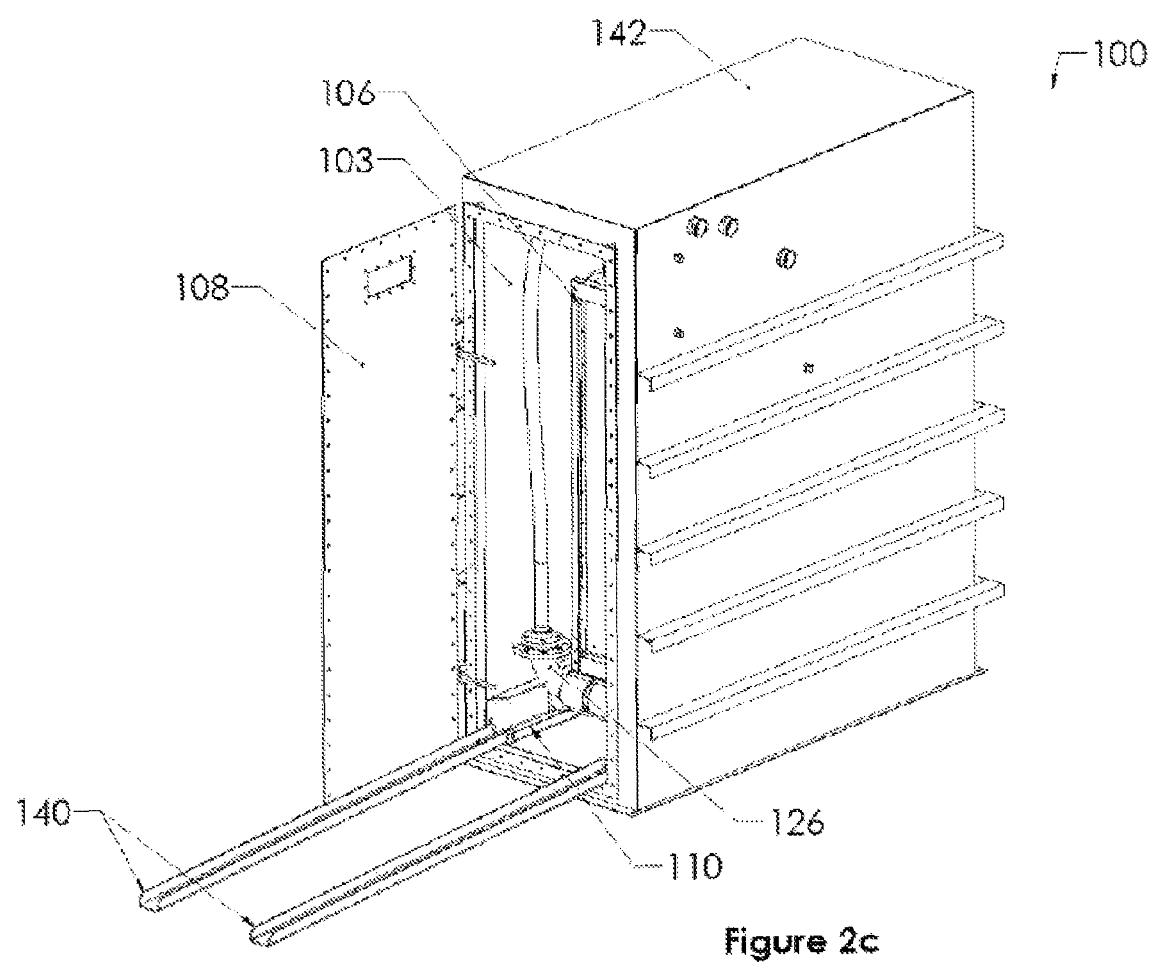
FIG. 2*c* is a simplified block diagram illustrating a perspective view of the side access tank facility with the door opened and the ramp lowered according to an embodiment of the invention; and, FIG. 2*d* is a simplified block diagram illustrating a perspective view of the side access tank facility with the door opened and the in-tank equipment holding structure moved to a position outside the enclosure according to an embodiment of the invention.
Figure 2D:
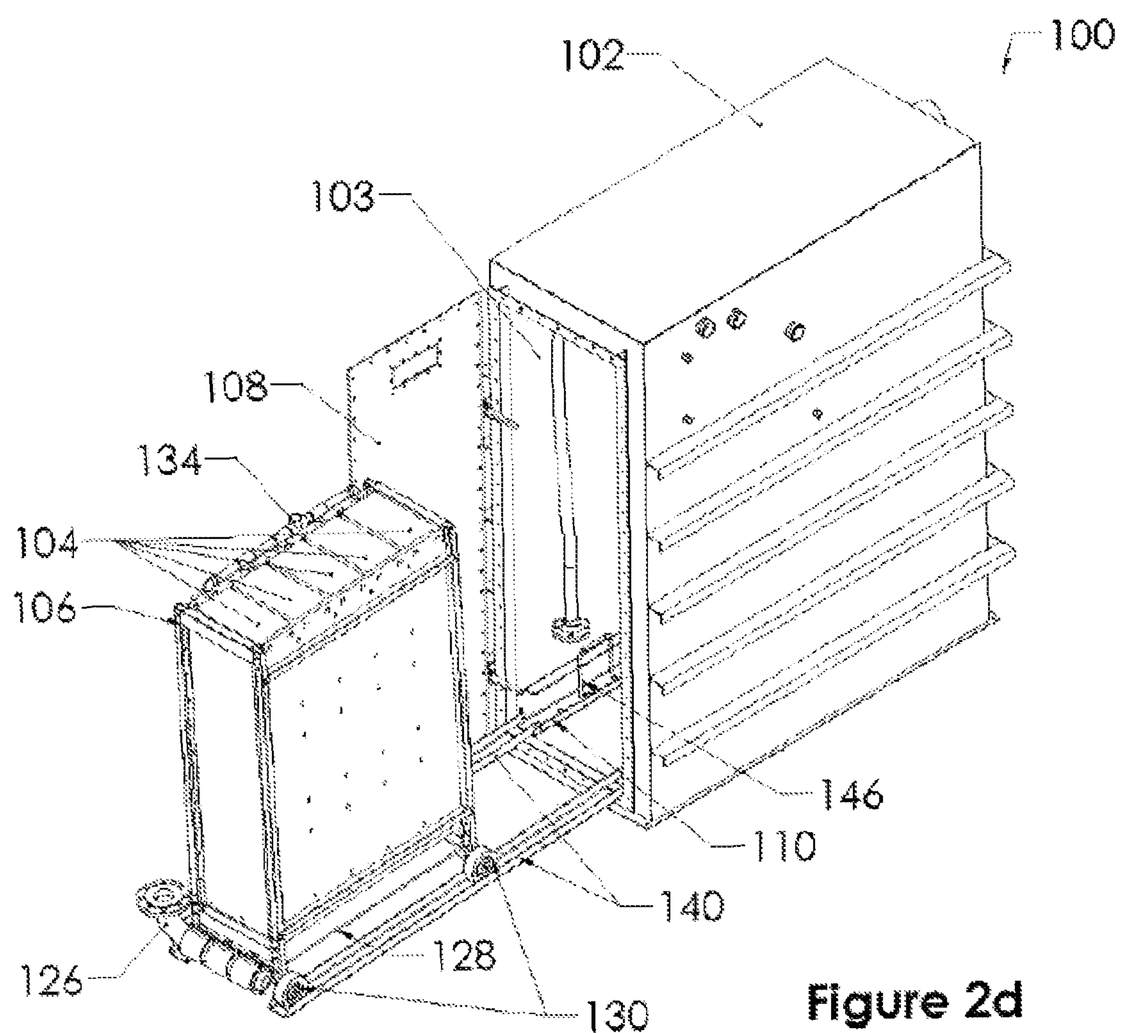

The side access tank facility 100 further comprises fluid conduits disposed inside the enclosure 102. The fluid conduits are, for example, in the case of the MBR illustrated in FIGS. 1*a* to 2*d*: a waste water input conduit 112 for filling the waste water into the enclosure 102; a filtrate conduit 114 connected to the filtrate collectors 132 of the membrane modules 104 via connecting piping 118 for removing the filtrated water by, for example, applying suction to the filtrate conduit 114; air conduit 120 for providing air to air diffuser 128 disposed in a bottom portion of the in-tank equipment holding structure 106 for cleaning the membranes 152 of the membrane modules 104; drain 124 for draining the enclosure 102; and overflow 128. The membrane modules 104 are, for example, flat plate membrane modules with each module comprising a plurality of membrane units 150 connected to filtrate collector 132 via apertures 154, as illustrated in FIG. 1*e*. Each membrane unit 150 comprises two elongated flat membranes 152 immersed in the waste water. Application of suction on the filtrate collector 132 draws water through pores of the membranes 152 while—depending on the size of the pores—blocking impurities such as particles, viruses, and bacteria from passing there through. The characteristics of a typical membrane used for waste water treatment are an average flux rate of $151/m^2/h$ and a pore size of 0.04 micron. The air bubbles provided by the air diffuser 128 rise in the waste water and clean the membranes 152 while propagating along the same.

The fluid conduits may be designed such that connection and disconnection of the same is enabled in proximity to the opening 103. For example, the air conduit 120 is connected to the air diffuser 128 via connecting mechanism 126 which is disposed in proximity to the opening 103. The connecting mechanism 126 is, for example, an off-the-shelf quick connecting mechanism, a screw mechanism or respective flanges with screw bolts nuts and washers. A portion of the filtrate conduit 114 is flexible and of sufficient length for enabling horizontal movement of the in-tank equipment holding structure 106 along a predetermined distance with the filtrate conduit 114 being connected to the connecting piping 118 via connecting mechanism 134. For example, the length is determined such that the in-tank equipment holding structure 106 is movable to a position such that the connecting mechanism 134 is in proximity to the opening 103 for facilitating connecting and disconnecting of the same. The connecting mechanism 134 is, for example, an off-the-shelf quick connecting mechanism, a screw mechanism or respective flanges with screw bolts nuts and washers. The filtrate conduit 114 is, for example, made of a flexible plastic material such as PVC.

As illustrated in FIGS. 2*a* to 2*d*, the side access tank facility 100 enables easy access to the in-tank equipment 104 by: opening the cover 108; lowering the ramp 140; disconnecting the air conduit 120, 126; removing the clamp 146; moving the in-tank equipment holding structure 106 along the predetermined distance; disconnecting the filtrate conduit 114, 134; and, removing the in-tank equipment holding structure 106 with the in-tank equipment 104 from the enclosure 102.

The side access tank facility 100 is also adaptable to accommodate other in-tank equipment 104 such as, for example: a pump by providing a fluid conduit and an electrical conduit; a mixer by providing an electrical conduit; or, an aerator by providing an air conduit.

The present invention has been described herein with regard to certain embodiments. However, it will be obvious to persons skilled in the art that a number of variations and modifications can be made without departing from the scope of the invention as described herein.

What is claimed is:

1. A side access tank facility comprising:
- an enclosure for containing water therein, the enclosure having an opening disposed in a side wall thereof;
- a cover for covering the opening in a water sealing engagement with the enclosure;
- an in-tank equipment holding structure, the in-tank equipment holding structure for holding in-tank equipment at a predetermined position inside the enclosure;
- a moving mechanism mounted to the in-tank equipment holding structure and disposed in proximity to a bottom thereof for moving the in-tank equipment holding structure between a position inside the enclosure and a position outside the enclosure; and,
- a guiding mechanism mounted to an inside surface of the enclosure and interacting with the moving mechanism, the guiding mechanism for guiding horizontal movement of the in-tank equipment holding structure between the position inside the enclosure and the position outside the enclosure, wherein the guiding mechanism comprises a rail structure and wherein the moving mechanism comprises wheels, and wherein the rail structure comprises a ramp pivotally movable mounted to the inside of the enclosure in proximity to the opening, the ramp being pivotally movable from a storage position inside the enclosure through the opening into an operating position with the ramp being oriented approximately horizontal.

2. A side access tank facility as defined in claim 1 further comprising:
- at least a fluid conduit disposed inside the enclosure and removable connected to the in-tank equipment, the at least a fluid conduit being designed such that connection and disconnection of the same is enabled in proximity to the opening.

3. A side access tank facility as defined in claim 2 wherein the in-tank equipment comprises at least a membrane module for filtering the water.

4. A side access tank facility as defined in claim 3 further comprising an air diffuser disposed in a bottom portion of the in-tank equipment holding structure.

5. A side access tank facility as defined in claim 1 wherein the guiding mechanism comprises a retaining mechanism for retaining the in-tank equipment holding structure in a predetermined position inside the enclosure.

6. A side access tank facility as defined in claim 1 wherein the cover is pivotally movable mounted to the enclosure.

7. A side access tank facility as defined in claim 2 wherein a portion of the fluid conduit is flexible and of sufficient length for enabling horizontal movement of the in-tank equipment holding structure along a predetermined distance with the fluid conduit being connected to the in-tank equipment.

8. A side access tank facility as defined in claim 1 wherein the rail structure comprises a ramp having an extension that is adapted for placement and support external the enclosure.

* * * * *